Patented Nov. 16, 1937

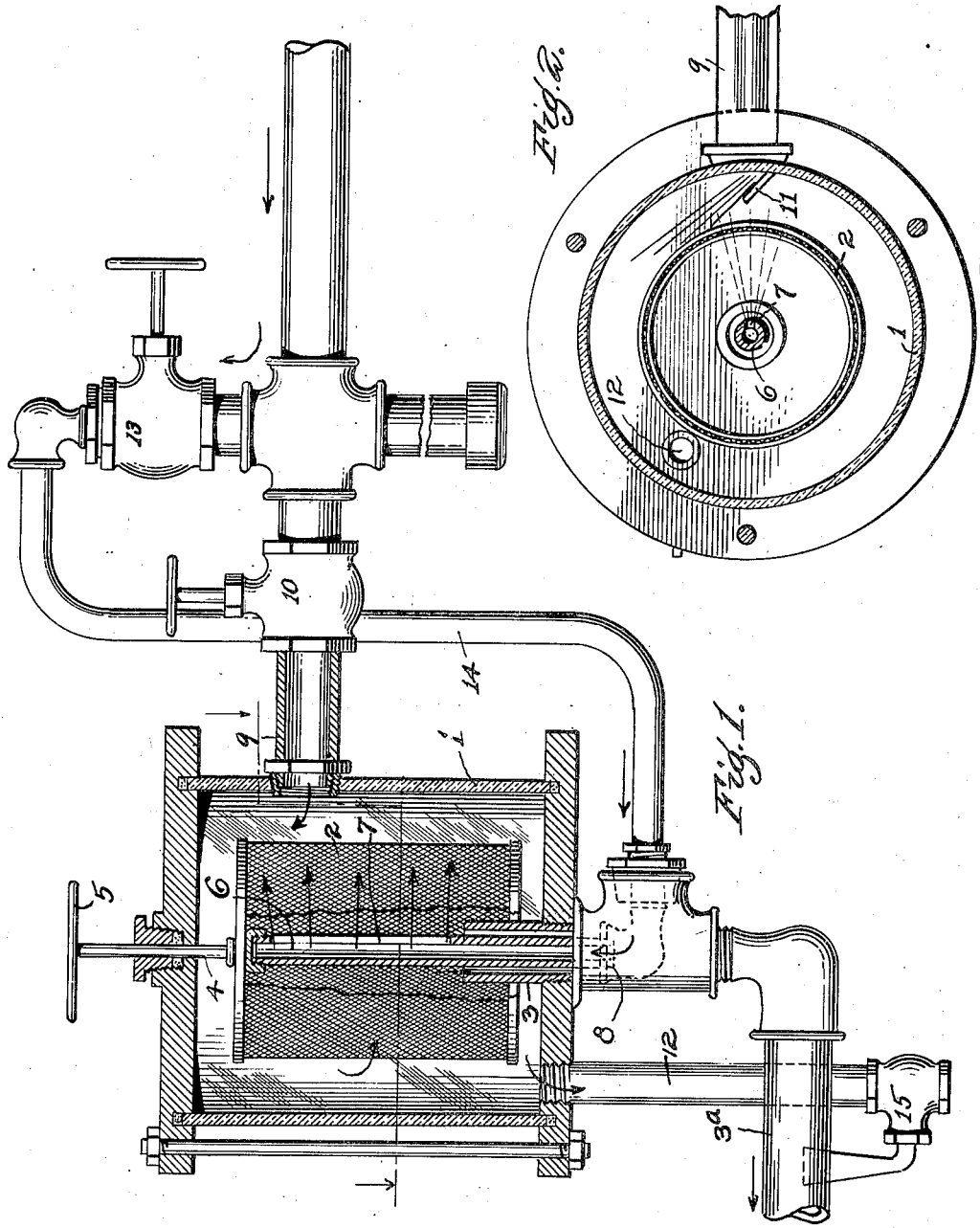

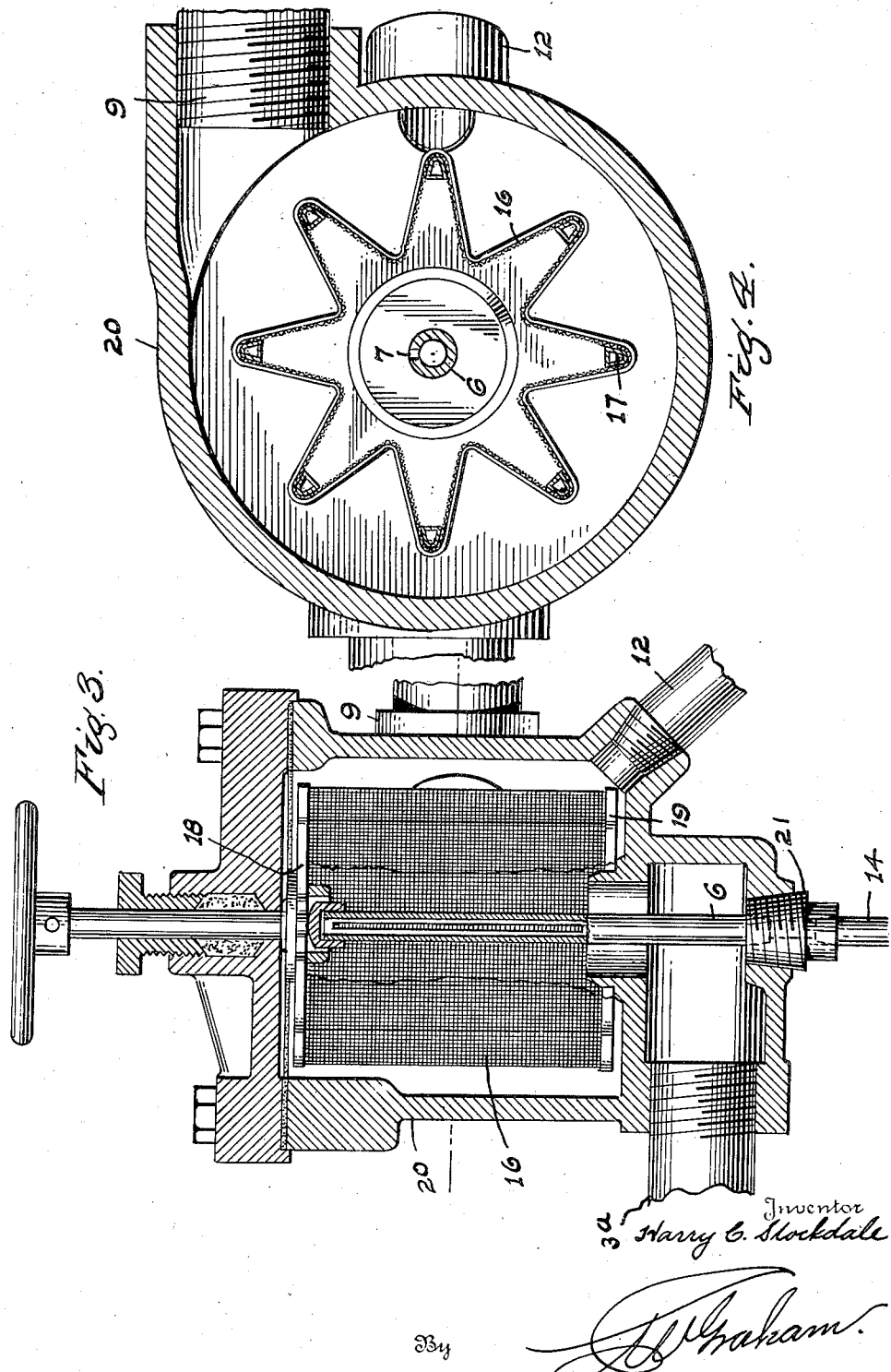

2,099,502

UNITED STATES PATENT OFFICE 2,099,502

CLEANING DEVICE FOR STRAINERS

Harry C. Stockdale, Ravenna, Ohio, assignor to Food Machinery Corporation, San Jose, Calif., a corporation of Delaware Application May 29, 1933, Serial No. 673,504
Renewed May 15, 1935

12 Claims. (Cl. 210—167)

This invention relates to a device for cleaning spray solutions and the like which are made up of soluble and unsoluble materials mixed with water or other liquid which usually carries more or less of sediment and fine debris and which is conveyed by suitable piping to spray nozzles where the material is projected under high pressure and velocity onto fruit trees, shrubs, ground vines or bushes or other vegetative growth for the control of insect pests and fungoid growths.

In the mixing and preparing of spray solution and the like both soluble and unsoluble materials are used, and sometimes both are mixed in the same solution. The unsoluble materials are ground very fine so as to contain the least possible amount of material that would tend to clog the small holes in the spray nozzles, which would very materially interfere with proper and efficient operation. With the unsoluble materials the water or other liquid simply acts as a carrying medium to convey the material to the spray nozzles.

The solutions are usually mixed in a large barrel or tank specially made for the purpose and the suction pipe inserted into the solution with sometimes a coarse wire screen strainer on the end to strain out the largest lumps if there are any and such other material that should not be admitted to the pipe line.

The smallest openings in the spray nozzles are made with about a No. 56 drill which measures about .046 of an inch. It can be readily seen that with so small an opening it will not require a very large piece of grit or other material to completely clog one of these holes, and thus stop the flow of spray material therefrom.

The subject matter of this invention comprises a specially constructed strainer that may be placed either in the suction line or the pressure line and which on account of its peculiar operation removes substantially every particle of sediment or grit that would tend to clog a nozzle opening, and it has means in its design to quickly clean it of all accumulated material and wash it away and out of the strainer body.

It is a very material saving of time and money to the grower if he can operate the spray outfit continuously without any trouble from clogged nozzles, which he can do with this device.

The device forming the subject matter of this application comprises a strainer casing, preferably placed in the pressure line, through which all of the spray solution must pass to get to the nozzles. A strainer of fine weave wire is placed in the housing and intercepts all of the liquid. The shape of this strainer is such that it passes the maximum of liquid and is in a measure somewhat self cleaning. The strainer is set above the bottom of the casing so that the sediment and material that cannot pass through the strainer will fall to the bottom of the casing where it can be removed at intervals by flushing it out of a suitable opening. The outlet from inside the strainer is also elevated above the bottom edge of the strainer so that such sediment as does get through the fine mesh gauze will fall to the bottom of the strainer and cannot get into the pipe line leading to the nozzles.

The solution flowing to the strainer casing is projected into the casing tangent to the screen member so that the body of solution in the strainer casing is given a somewhat whirling motion which also helps to keep the surface of the strainer clean during regular operation.

When the strainer accumulates sufficient sediment to require cleaning, it will be found that the most of this sediment is adhering to the outer surface of the screen. To clean the screen the pressure line entering the screen casing is temporarily closed and the flow of solution is by-passed to a central pipe inside the screen and which has a longitudinal slot which projects the stream of solution in a wide fan shaped spray that impinges with considerable force against the inside surface of the screen as the screen is slowly revolved by a hand wheel under the control of an operator. The drain pipe leading from the casing is opened during this cleaning operation so that the sediment washed off the screen immediately flows out of the casing.

This cleaning operation requires only a few seconds so that the stoppage of the spraying operation is only momentary.

The only operation required of the operator to effect a thorough cleaning of the screen is the opening of the by-pass valve and the drain valve and closing the line going into the strainer casing, and of course the reverse of these operations will set the apparatus in regular operation.

It is therefore an object of the invention to provide a solution cleaning device for placement in spray lines to strain out any sediment that would tend to clog the spray nozzles.

It is a further object of the invention to provide a strainer in a spray line through which all of the solution must pass to the spray nozzles and providing a by-pass line leading into the strainer housing to clean accumulated sediment from the strainer gauze by means of spray solution.

It is also an object of the invention to provide a strainer in a spray line through which all of the spray solution must pass and in providing a by-pass into the strainer housing to direct solution in an opposite direction through the screen to remove accumulated sediment therefrom.

It is a further object of the invention to provide a strainer in the pipe line leading to a number of spray nozzles through which all of the spray solution must pass and placing a cleaning tube inside the strainer member by means of which a fan shaped stream of spray solution may be projected while the screen member is revolved to thereby remove all sediment from the meshes of the screen member.

It is a further object of the invention to provide a strainer in a pipe line leading to spray nozzles through which all of the spray solution must pass and in projecting the solution into the strainer housing tangent to the strainer member to set up a whirling motion to the solution and thus afford some measure of cleaning and keeping the screen free of sediment.

With such objects in view as well as other advantages which may be inherent in the invention, consisting in the parts and combinations hereinafter set forth, it is understood that the several necessary parts and combinations constituting the same may be varied in their proportions, placement and general arrangement without departing from the scope and nature of the invention, and in order to make the invention more clearly understood there are shown, somewhat diagrammatically in the accompanying drawings means and mechanism for placing the same in the preferred form without limiting the improvements in their application to the particular construction shown to illustrate the invention.

Figure 1 is a vertical sectional elevation showing one arrangement of the strainer device and the manner of connecting the various parts.

Figure 2 is a cross section on approximately the line 2—2 of Figure 1.

Figure 3 is another construction embodying the same principle of operation but with the operative elements arranged somewhat differently.

Figure 4 is a cross sectional view taken on substantially the line 4—4 of Figure 3, and clearly shows a star shaped screen member.

The housing of the strainer is made of a suitable material and is designated by the numeral 1. 2 is the strainer element and in this instance is shown as a circular screen of fine mesh. The strainer is mounted for rotation and is supported on the slotted pipe 6, and is turned on its axis by means of the stem 4 and hand wheel 5.

The pipe 6 has a vertical slot 7 through which a fan shaped stream of solution is projected against the screen as it is rotated by the hand wheel to clean it of accumulated sediment.

Spray solution is admitted to the housing 1 through the pipe line 9 and by means of a baffle 11 the solution is turned tangentially to the screen member which tends to set up a whirling motion in the solution and tends to keep the screen member clean. It may be found that the baffle 11 is not needed in which case the stream of solution will enter centrally of the circular screen.

The strainer 2 being made of a very fine mesh wire gauze it will stop the passage of any sediment that would tend to clog the small openings in the spray nozzles, which are not shown but are at the extreme end of the delivery pipe 3.

Entering the solution tangent to the screen member the swirling motion of the solution will wash off very much of the adhering sediment on the screen which makes the device somewhat self cleaning during operation. The sediment that is washed off the screen will drop to the bottom of the housing 1 and will be flushed out of the housing at intervals.

When the screen member 2 becomes clogged so that the flow of solution begins to be interfered with the screen is thoroughly cleaned from the inside in the following manner.

A by-pass line 14 is provided leading from the valve 13 to the connection 8 on the bottom of the housing 1.

During normal operation the solution flows through the pipe 9 into the housing, through the screen member 2, through the bushing 3 and out through the delivery pipe 3a.

By opening the valve 13 and the drain pipe 12 and then closing the valve 10 in the pipe 9 the solution flows through the by-pass line 14 up into the slotted tube 6 and out through the slot in a fan shaped stream which impinges against the inside surface of the screen 2 with the full pressure of the system, then by turning the screen 2 by means of the hand wheel 5, which is secured to the screen top plate the entire inner surface of the screen is subjected to the fan spray with the result that in a few seconds the screen is completely cleaned of all adhering sediment which drops into the bottom of the housing and passes out through the drain 12.

Opening valve 10 and closing valves 13 and 15 the solution will again flow into the housing and through the screen and out through the delivery pipe 3 which establishes normal operation.

It will be observed that the bushing 3 extends up above the lower head plate of the screen member so that a space is provided inside the screen member for the accumulation of very fine sediment that may get through the screen. The solution must rise above the top of the bushing 3 before it can flow out through the pipe 3a so that any sediment depositing in the bottom of the screen member will remain there on account of it being heavier than the liquid which will flow over the end of the bushing 3.

The swirling motion given to the solution entering the housing will also tend to keep the heavier sediment away from the screen through centrifugal action throwing it outward against the inside of the housing from where it will find its way to the bottom of the housing and will accumulate there until the housing is flushed out by opening the valve 15.

Figures 3 and 4 show what might be a preferred construction from a manufacturing standpoint, and while the operative principle is exactly the same as the structure in Figs. 1 and 2, the screen member particularly is shaped differently.

The screen member 16 is star shaped, the outer points of the star being soldered or otherwise fastened to the posts 17 of a frame member having heads 18 and 19 connected by the posts 17 thus forming the frame for sustaining the star shaped screen 16.

The solution under normal operation enters the housing 20 at a tangent thereto so that the spray material is given a swirling motion, although as stated for the structure of Figs. 1 and 2 the solution may enter centrally if desired, the star shaped screen in this structure will tend to interrupt the swirling of the solution and cause it to wash along the sides of the star and thus clean away any adhering sediment the instant it lodges on the screen and thereby keep the screen clean for a longer time before it becomes necessary to clean it through the by-pass system.

The slotted central pipe inside the screen is the same in this structure as in Figs. 1 and 2 and the screen is rotated around the slotted cleaning pipe in the same manner.

The by-pass connections would be the same for the structure of Figs. 3 and 4 as they are in Figs. 1 and 2, therefore they have not been duplicated in Figs. 3 and 4.

The bottom of the strainer housing in Fig. 3 is somewhat different than the structure of Fig. 1. A boss is cast integral with the housing to carry the delivery pipe 3a, and the slotted pipe 6 extends up through this boss and finds support in the plug 21, which also receives the end of the by-pass pipe 14. The drain pipe 12 is placed at the bottom corner of the housing, so the device may be used in either a horizontal or vertical position. The by-pass line 14 is bent sideways to clear the inlet pipe 9 and the valve 10. This bend does not show in the drawings.

The valve 10 in Fig. 1 is only necessary when the device is placed in the pressure line. When the device is placed in the suction line the operation for cleaning the screen would be to open the drain valve 15 and open the valve 13 and turn the screen, closing these valves would then return the device to normal operation.

The importance of this invention may be realized when it is considered that it takes only a very minute particle of grit or sediment to completely clog the smal hole in a nozzle. Often nozzles are working down in under the vines of low growing crops where they cannot be seen by the operator who is driving the spray machine and the operator may travel an entire row the full length of the field with one or more nozzles not operating properly which would seriously affect his control on those vines.

This of course would refer to row crop machines where the smallest nozzles are used and even though the nozzles were not in or under the vines, one man operating the machine cannot very easily watch all of the nozzles on a multi-row spraying device and watch the driving of the machine so that it is a very great advantage to the grower to have the installation include a strainer that will effectively stop all sediment that would tend to clog one or more of the nozzles.

During the last season one grower who had this strainer installed in the spray line operated the entire season without one instance of a clogged nozzle which shows quite effectively the great value of this device to a grower, while on previous machines it was not uncommon to have to stop complete operations and walk across the fields to clean nozzles which was a great inconvenience and time loser as well as a much lower efficiency of operation by the lack of application of the spray solution while the nozzles were clogged and before it was noticed that they were clogged.

What I claim as new and desire to secure by Letters Patent is:

1. A straining device for arresting the movement of spray residue along a flowing stream of spray material comprising a housing, a pipe line for directing a stream of spray material into said housing, a closed screen member within said housing, a pipe constituting an overflow outlet for screen spray material, the overflow outlet being located wholly within said closed screening member and above the bottom thereof, a by-pass pipe line between said inlet pipe and said overflow outlet for reversing the flow of spray material through said screening member for cleaning accumulated residue therefrom, the inlet end of said by-pass pipe line entering said screening member through said overflow outlet.

2. A straining device for arresting the movement of spray residue along a flowing stream of spray material comprising a housing, a pipe line for directing a stream of spray material into said housing, a cylindrical closed screen member within said housing, means for rotating said screen member upon occasion for cleaning, a pipe constituting an overflow outlet for screened spray material, the overflow outlet being located wholly within said closed screen member and above the bottom thereof, a by-pass pipe line between said inlet pipe and said overflow outlet for reversing the flow of spray material through said screen member for cleaning accumulated residue therefrom, the inlet end of said by-pass pipe entering said screen member through said overflow outlet and extending upward therefrom to encompass the entire inner surface of said screen member when rotated.

3. A device for screening a stream of fluid spray material for preventing the passage of residue therethrough comprising a housing, means for directing a stream of fluid spray material into said housing, a screen member closed substantially centrally located in said housing and means within and above the bottom of the screen member for directing screened fluid spray material away from said housing, said screen member being mounted for rotation for cleaning purposes, a by-pass line connected to said housing in a manner to direct fluid spray material to flow through said screen in a direction opposite to the normal flow with means for directing a stream of spray material against the entire surface of said screen member while it is being rotated to remove accumulated residue therefrom.

4. A device for screening a stream of fluid spray material for arresting the movement of residue therealong comprising a housing, means for directing a stream of fluid spray material to said housing, a closed cylindrical screen member in said housing through which all of said stream must pass and means within and above the bottom of said screen member for directing the screened stream away from said housing, means for rotating said cylindrical screen member upon occasion, a by-pass line connected to said housing for directing the stream of spray material through said screen member in a direction opposite to that of normal flow to remove from said screen member while it is rotated any accumulated residue, with means in said housing for collecting the discharged residue and conveying it away therefrom.

5. A device for screening a stream of fluid spray material for arresting the movement of residue therealong comprising a housing, means for directing fluid spray material to said housing and means for directing the spray material passing through said housing away therefrom, a closed cylindrical screen member mounted in said housing in a manner to intercept the entire flow of spray material therethrough, an overflow within said screen member and above the bottom thereof for passage of the screened fluid, means for rotating said cylindrical screen member upon occasion, means inside of said screen member for directing spray material over the inner surface thereof for dislodging accumulated residue therefrom while said screen member is rotated.

6. A device for screening a stream of fluid spray material for arresting the movement of residue therealong comprising a housing, means for directing a stream of spray material into said housing tangent thereof, a closed screen member in said housing to intercept the entire stream of spray material passing through said housing, an overflow within said screen member and above the bottom thereof for passage of the screened fluid, means for rotating said screen member upon occasion for cleaning the same and means inside of said screen member for directing a stream of spray material against the surfaces thereof to remove any accumulated residue.

7. A device for screening a stream of fluid spray material for arresting the movement of residue therealong comprising a housing adapted to vertical or horizontal placement, means for directing a stream of spray material into said housing tangentially thereof, and means for directing spray material away from said housing angularly thereof, a closed screen member in said housing mounted to intercept the entire stream of spray material and an overflow within said screen member and above the bottom thereof for passage of the screened spray material, means for rotating said screen member upon occasion, and means for projecting a stream of cleaning material across the inner surface of said screen member while being rotated to remove accumulated residue therefrom.

8. A device for arresting the movement of residue along a stream of spray maetrial comprising a housing, a closed screen member in said housing, means for directing a stream of spray material into said housing, and means comprising an overflow within and above the bottom of said screen member for directing said screened stream away from said housing said screen member being located to intercept the entire flow of said stream, means for rotating said screen member upon occasion for cleaning purposes, means associated with said stream line for reversing the flow of material into and through said housing and means associated therewith for directing the reversed flow against the surfaces of said screen member for removing any accumulated residue therefrom while said screen member is rotated.

9. A device for screening a stream of fluid material for arresting the movement of residue therealong comprising a housing, means for directing fluid material to said housing and means for directing the screened material away from said housing, a tubular screen member mounted in said housing in a manner to intercept the entire flow of fluid material therethrough, an opening within said screen member forming an outlet for the passage of the screened fluid, means for imparting relative rotation between said housing and said screen member upon occasion, means inside of said screen member and entering through the said outlet for directing fluid material over the surface thereof for dislodging accumulated residue therefrom.

10. In a liquid straining device, a housing defining a straining chamber therewithin and having an inlet for the supply of liquid into said chamber, an open ended outlet pipe projecting upwardly into said chamber above the bottom thereof, a tubular screen rotatably mounted within said chamber above the outlet pipe to enclose the open end thereof whereby to intercept and strain the liquid flowing through said chamber, means for rotating said screen, a flushing pipe entering through said outlet pipe and extending into the interior of said screen member for discharging liquid through said screen into said chamber to clear the screen of foreign material adhering exteriorly thereof, and means for draining said chamber.

11. A device for screening a stream of fluid material comprising a housing, an inlet for directing fluid material into said housing and an outlet for directing the screened material from said housing, a tubular screen member within said housing for intercepting the entire flow of material entering through said inlet, the said outlet connecting with said screen member to direct the entire flow of material from said housing, means for imparting rotation to said screen member at will, an inlet entering said screen member through the said outlet to direct fluid material against the inner surfaces of said tubular screen member to remove accumulated residue therefrom and discharge it into said housing with means for draining said housing.

12. A device for screening a stream of fluid material comprising a housing, an inlet for directing fluid material into said housing and an outlet for directing the screened material from said housing, an enclosed screen member within said housing for intercepting the entire flow of material entering through said inlet, the said outlet connecting with said enclosed screen member to direct the entire flow of screened material from said housing, means for imparting rotation to said screen member at will, an inlet connected with said main stream flow and entering the interior of said screen member through the said outlet also connected therewith and adapted to direct the said fluid material to flow in an opposite direction through said screen member to contact with the inner surfaces thereof and dislodge any adhering residue from the outside thereof which will deposit in said housing and means for draining said housing.

HARRY C. STOCKDALE.